(12) United States Patent
Domingo et al.

(10) Patent No.: US 9,340,674 B2
(45) Date of Patent: May 17, 2016

(54) SUSTAINABLE RANGE OF DYESTUFFS FOR TEXTILE AND PAPER DYEING

(75) Inventors: Manuel Jose Domingo, Barcelona (ES); Joan Manel Blanquera, Barcelona (ES); Yolanda Garcia, Barcelona (ES)

(73) Assignee: CLARIANT INTERNATIONAL LTD, Muttenz (CH)

( * ) Notice: Subject to any disclaimer, the term of this patent is extended or adjusted under 35 U.S.C. 154(b) by 207 days.

(21) Appl. No.: 14/119,836

(22) PCT Filed: May 23, 2012

(86) PCT No.: PCT/EP2012/002208
§ 371 (c)(1),
(2), (4) Date: Feb. 6, 2014

(87) PCT Pub. No.: WO2012/163498
PCT Pub. Date: Dec. 6, 2012

(65) Prior Publication Data
US 2014/0189963 A1    Jul. 10, 2014

(30) Foreign Application Priority Data
May 27, 2011  (EP) .................................. 11004370

(51) Int. Cl.
| | | |
|---|---|---|
| *C09B 61/00* | (2006.01) | |
| *C09B 49/00* | (2006.01) | |
| *D06P 1/30* | (2006.01) | |
| *D06P 1/34* | (2006.01) | |

(52) U.S. Cl.
CPC .................. *C09B 61/00* (2013.01); *C09B 49/00* (2013.01); *D06P 1/30* (2013.01); *D06P 1/34* (2013.01)

(58) Field of Classification Search
CPC ........... C09B 49/00; C09B 61/00; D06P 1/34; D06P 1/30
USPC ............................................................ 8/438
See application file for complete search history.

(56) References Cited

U.S. PATENT DOCUMENTS

| | | |
|---|---|---|
| 4,452,822 A | 6/1984 | Shrikhande |
| 4,892,588 A * | 1/1990 | Dilling ................ C09B 67/0086 106/501.1 |
| 5,908,650 A | 6/1999 | Lenoble et al. |

FOREIGN PATENT DOCUMENTS

| | | |
|---|---|---|
| EP | 0741168 | 11/1996 |
| JP | 2010144279 A | 7/2010 |

OTHER PUBLICATIONS

International Search Report for PCT/EP2012/002208 Mailed Jun. 29, 2012.
Croissant et al: "Memoire sur les 1-15 sulfures organiques. presente a la Societe industrielle de Mul house", Bulletin De La Societe Industrielle De Mulhouse vol. 44. Oct. 1, 1874, pp. 465-485, XP009160368. (Only French article available) Partial translation.

* cited by examiner

*Primary Examiner* — Eisa Elhilo
(74) *Attorney, Agent, or Firm* — MMWV IP, LLC

(57) ABSTRACT

The invention refers to the manufacturing of a novel group of sulfur dyes in which are used, as raw material, different kind of natural "biomass", usually existing in the nature, and transforming them into soluble dyestuffs, capable to dye textile fibers, preferably cellulose fibers and derivatives, as cotton, viscose, paper, tencel, with high strength and fast color properties. For this purpose, the concept "Biomass", is defined as the residual product obtained from the usual human crop activities, in agricultural and forestry sectors.

20 Claims, No Drawings

SUSTAINABLE RANGE OF DYESTUFFS FOR TEXTILE AND PAPER DYEING

CROSS REFERENCE TO RELATED APPLICATIONS

This application is a §371 National Stage Application of PCT/EP2012/002208, filed May 23, 2012, which claims priority to European Application No. 11004370.0, filed May 27, 2011.

BACKGROUND OF THE INVENTION

Field of the Invention and Description of Related Art

Sulfur dyes are commonly known for dyeing textile cellulosic materials or blends of cellulosic fibers with synthetic fibers. The range of colors covers black, blue, olive, and brown, but the hues are dull compared with other dye classes. The first sulfur dyes were produced in 1873 by heating organic cellulose-containing material, such as wood sawdust, humus, bran, cotton waste, and waste paper with alkali sulfides and polysulfide (Brit. Pat. 1489; E. Croissant and L. M. F. Bretonniere, Bull. Soc. Ind. Mulhouse 44, 465 (1874).

According to Brit. Pat. 1489, said heating was performed without any intermedium and without preliminary preparation or conversion before contact with the sulfides. However, these dyes are reported to be dark and hygroscopic, had a bad color, were toxic and had a bad smell (Kirk-Othmer Encyclopedia of Chemical Technology, Sulfur Dyes, pg. 1-22, Wiley Online Library, published 4. December 2000).

Nowadays it is well-known that a group of colors, as some browns, olives, greys, oranges and yellows can be obtained by mixing sulfur, sulfides and/or polysulfides with different well defined organic aromatic compounds and reacting these mixtures at high temperatures. Theses raw materials come from different benzene derivatives, the most important being: amino compounds such as m-phenylenediamine, m-toluenediamine, p-toluidine, aniline, p-phenylenediamine; amino-nitro compounds such as p-nitroaniline, amino-nitrotoluene; phenol compounds such as beta-naphthol, p-aminophenol, hydroquinone.

All these organic compounds that are used today come from petroleum aromatic chemistry, and most of them are considered as toxicologically harmful, some of them also potentially mutagenic and carcinogenic.

Additionally, the petroleum chemistry contributes significantly to the global warming and furthermore, the chemical operations necessary to purify these intermediates, in order to be commercialized and used in the whole dye manufacturing industry, requires lots of energetic resources and generates also additional by-products.

Another present days ecological concept is the cultivation of real dye plants. This, however, would require about 100 million tons of dye plants to dye the total world cotton and wool. The surface necessary to cultivate is estimated to be approximately 100 to 200 million hectares, which accounts for 10 to 20% of the global effort to cereals. The effect of such kind of monocultures would be disastrous for nature.

The human crop activities in forests and in agriculture generate large amounts of vegetal wastes. These wastes from forestry and agricultural crops represent thousands of tons of natural vegetal products called "biomass" that in some cases can be used as energy fuel, and in other cases disposed as wastes.

The object of the present invention is to develop a manufacturing system which is able to value and transform part of these "biomass" products into dyestuffs.

These dyestuffs should have affinity for textiles and paper, preferably cellulose fibers, with good general fastness properties, e.g. wet, rub and light fastness. However, the greatest interest and main characteristic of this invention comes from the fact that said vegetal biomass collaborates thereby in the sustainability of the environment, avoiding the use of aromatic toxic compounds, and reducing the $CO_2$ generation in comparison with present known procedures of the petroleum aromatic chemistry.

It was found surprisingly that this object can be achieved by transforming pretreated vegetal biomass, especially waste biomass, into an aqueous sulfur dye solution.

By this reason from now we would name these dyes as "EARTH—color—S".

"EARTH" because this word describes the origin of the biomass which is used as starting raw material, and also because the shades of the obtained dyes are in line with the colors of the earth nature.

"color" because the final obtained product has dyeing properties.

"S" because the other component that is used in the synthesis, in order to form the final polymeric dyestuff, is basically sulfur, a sulfide and/or polysulfides.

Such dyes coming from the use of natural vegetal wastes can be considered as "sustainable dyes".

SUMMARY

A subject of the present invention is a process for manufacturing dyestuffs comprising the steps of
(i) Providing vegetal biomass, preferably waste biomass, more preferably biomass coming from industrial agricultural wastes;
(ii) Pretreating said vegetal biomass with an aqueous alkaline medium and/or with an amino or polyamino compound, at elevated temperatures;
(iii) Mixing the pretreated vegetal biomass with a sulfurization agent selected from the group consisting of sulfur, sulfide, polysulfide and a combination thereof;
(iv) Heating said mixture to a temperature of between 120 and 350° C. for at least 2 hours;
(v) Dissolving the mixture obtained in step (iv) in aqueous medium and optionally removing undissolved solid particles.

DETAILED DESCRIPTION OF A PREFERRED EMBODIMENT (i) On principle, the biomass can be any kind of plant products, especially from forest or agricultural crop activities or from marine sources. It is difficult to define all these plant products in chemical terms, but roughly the following groups can be identified:
(a) Plant products containing from about 3 to 50% by weight, based on dry mass, of lignine, further components can be polysaccharides, e.g. cellulose. Examples are biomass sources obtained from wastes of forestry activities, e.g. tree barks, wood chips, wood pellets, saw dust, cotton residues, or from agricultural crop activities, such as shells from dry fruits, preferably nutshells, e.g. hazelnut shells, walnut shells, coconut shells, cashew nut shells, pistachio shells, pine fruit shells, and almond shells, further cereals, fruit pits, such as date pits, cherry pits, olive pits.

(b) Plant products, mostly related to fruits, containing phenols and polyphenols in an amount from about 5 to 50% by weight, based on dry mass. Further components may be terpenes, phenolic acids, stilbenes, lignans, flavonoids, tannins, lipids, proteins. Examples are olive pulp, olive orujillo, pips flour, rice residues, grape marc, sun flower pulp, soybean pulp, canola bagasse, herbs ground, corncob and coffee ground.

(c) Plant products from marine sources, such as algae, e.g. brown, red and green algae. Algae usually contain as main components alginic acid, xylans, mannitol, proteins, tannins depending on the algal species.

In a further preferred embodiment of the invention, the biomass source is a combination of groups (a) and (b), for example a grape residue containing the peel, the seeds and parts of the branches.

This list does not exclude any other biomass waste that can be obtained as a result of agricultural activities, which, on the other hand, will depend on the different country activities and soil characteristics.

Preferred biomass is obtained from alimentary crops as specified above, especially from their wastes as shells of dry fruits, e.g. nutshells, fruit pits and coffee ground.

Depending on the size of the biomass pieces it can be advantageous to reduce its size by an adequate operation, e.g. by slicing, chopping, pelletizing, cutting or milling, before introducing into the process of the present invention.

(ii) In one embodiment of the invention, the pretreatment of the vegetal biomass is expediently carried out in an alkaline aqueous medium having a pH of above 9, e.g. between 10 and 14. Preferred alkaline agents can be inorganic hydroxides and basic salts, such as caustic soda, caustic potash, sodium carbonate and potassium carbonate, or $NH_4OH$.

Preferred is an alkaline aqueous medium of 5 to 50% by weight concentration of sodium or potassium hydroxide in water.

The amounts by weight between the biomass and the alkaline aqueous medium can vary within wide limits, e.g. from 1:10 to 10:1, preferably between 1:5 and 5:1. The amounts by weight between the biomass (based on dry weight) and alkaline agent (based on dry weight) are preferably between 1:3 and 3:1, more preferred between 1:2 and 2:1.

In another embodiment of the invention, the pretreatment of the vegetal biomass is carried out with an amino or polyamino compound, preferably with an organic amino compound having at least one amino group, such as monoalkylamines and monoalkylamino alcohols.

Examples for useful organic amino compounds having at least one $NH_2$ group are: Methylamine, ethylamine, n- and i-propylamine, n-, i- and t-butylamine, amylamines, $C_6$-$C_{18}$-alkylamines, monoethanolamine, monopropanolamines, monobutanolamines, $C_5$-$C_{18}$-hydroxyalkylamines, ethylenediamine, propylenediamines, butylenediamines, $C_5$-$C_{18}$-alkylenediamines; urea, guanidine and dicyandiamide.

Examples for polyamino compounds are di($C_1$-$C_4$-alkylene)triamines, e.g. diethylenetriamine, and tri ($C_1$-$C_4$-alkylene)tetramines, e.g. triethylenetetramine.

Particularly useful organic compounds for the pretreatment step of the present invention have at least two amino groups, or at least one amino and at least one hydroxyl group, so that they can react with aldehyde or acetal groups of the vegetal biomass in a condensation reaction. Exemplary compounds are monoethanolamine, monopropanolamines, monobutanolamines, $C_s$-$C_{18}$-hydroxyalkylamines, ethylenediamine, propylenediamines, butylenediamines, $C_5$-$C_{18}$-alkylenediamines; urea, diethylenetriamine, triethylentetramines, guanidine and dicyandiamide.

The amounts by weight between the biomass (based on dry weight) and the amino or polyamino compound can vary within wide limits, e.g. from 1:10 to 10:1, preferably between 1:5 and 5:1, more preferably between 1:3 and 3:1, most preferred between 1:2 and 2:1.

The amino or polyamino compounds can be added in substance or in aqueous solution. The aqueous solution can contain an alkaline agent as specified above.

The temperature of said pretreatment is expediently between 40 and 200° C., preferably between 110 and 170° C.

The duration of said pretreatment is expediently between 1 and 48 hours, preferably between 2 and 18 hours.

It is possible for water being evaporated off during the pretreatment step.

However, it is preferred to heat under reflux or under pressure to obtain a liquid or pasty mass.

(iii) For sulfurization, the resulting pretreated mixture from step (ii), preferably without isolation, is combined, preferably under stirring or any other kind of agitation, with sulfur, alkali sulfide, alkali polysulfide or a combination thereof, hereinafter called sulfurization agent.

Sulfur can be any known modification of elementary sulfur, preferred is rhombic alpha sulfur.

Preferred sulfides are metal sulfides, most preferred are alkali metal sulfides, such as sodium sulfide, sodium hydrogen sulfide, potassium sulfide and potassium hydrogen sulfide.

Preferred polysulfides are alkali metal polysulfides arising by treatment of alkali sulfide with elemental sulfur, e.g. sodium polysulfide and potassium polysulfide.

The sulfides and polysulfides can be introduced in solid form or as aqueous solution.

The relative amount by weight between the sulfurization agent and the pretreated vegetal biomass (calculated on dry weight) can vary between 1:10 to 10:1, preferably between 1:1 to 10:1, more preferably between 1:1 and 5:1, even more preferably between 1:1 and 3:1, most preferably between 1:1 and 2.5:1.

Of course, it is also possible to use less sulfurization agent than indicated before, however, a part of the biomass would remain unreacted, thus rendering the process less economic.

(iv) The resulting mixture of step (iii) is heated to temperatures between 120 and 350° C., preferably between 150 and 320° C., more preferred between 160 and 300° C., most preferred between 180 and 270° C., for at least 2 hours, preferably for 6 to 48 hours, more preferred for 10 to 30 hours.

This heating step is carried out in the presence of the amino compound and/or the alkaline medium coming from the alkaline agents of step (ii) and from the alkali sulfides or polysulfides, if used. In case that the water is not evaporated and the reaction is performed in liquid form until the end, a suitable pressure device is to be used.

In a preferred embodiment, the reaction is done in bake-pot reactors, also called dry way reactors, wherein at the beginning the reaction mass is still liquid and can be stirred, then during the heating step water evaporates off and the mass becomes a solid and the stirring is automatically stopped. The reaction may continue while heating the reactor walls. During the reaction $H_2S$ is released and can be collected in an alkaline scrubber. This gas formation also helps to have a good heat transfer inside the solid mass.

During this step, it is supposed that sulfur interacts with the pretreated biomass material, introducing active groups that will provide for good water solubility along with cellulose affinity, and of course, the chromophoric final dye-shade. One of the facts that demonstrates that sulfur interacts with the biomass is the H₂S formation where the sulfur releases two hydrogen atoms from the organic biomass molecule and replacing them with a sulfur atom. This happens in dry sulfurizations as well as in wet sulfurizations and independently from the pH.

Basically the heating conditions and time provide for a good "cooking" of the biomass which effect is more related with the strength of the final dye, the solubility and dyeing properties. The color shade is much more linked to the kind of biomass used. Normally more rigorous heating conditions lead to a deeper shade with higher strength. Too high temperatures, however, could "burn" the product, so it is experimental to find the right temperatures and time for the best performance in terms of final dye yield and desired shade.

(v) At the end of the sulfurization reaction, the obtained product is dissolved in water or in alkaline aqueous medium. If present, solid particles are removed, e.g. by filtration, decantation or any other suitable measure.

If more alkaline agent was present than H₂S formed the final product is alkaline.

If the water evaporated off during the sulfurization, the product is a solid.

As alkaline pH favors the solubilization of the sulfurized solid product, it is preferred that the aqueous solution prepared therefrom has an alkaline pH, preferably above 8, more preferably above 9, e.g. between 8 and 14, more preferably between 9 and 13.

Once the solubilization has been finished, there is obtained a liquid aqueous solution of the solubilized "biomass" that we could name as "liquid EARTH—color—S".

As one of the objects of the present invention is to avoid the formation of toxic by-products, especially the free sulfide content in the final product should be as low as possible.

This object can in many cases be fulfilled simply by adjusting the amount of the sulfurization agent relative to the amount of biomass within the limits specified above.

In order to reduce the free sulfide amount it can also be advantageous to add an oxidizing agent which is able to react with sulfide in alkaline medium, such as air, oxygen, peroxides or chlorites, to the aqueous alkaline solution containing the solubilized sulfurized product. This oxidation is preferably done at temperatures between 20 and 70° C.

Even today little is known about the chemical structure of sulfur dyes and therefore they can only be classified according to its manufacturing process and the nature of the starting materials.

Therefore, another subject of the present invention is an aqueous solution of a dyestuff prepared by the process described before.

Contrary to state-of-the-art sulfur dyes the aqueous dyestuff solution of the present invention is devoid of bad odor, and contains free sulfide ($S^{2-}$ ions, $HS^-$ ions and $H_2S$) in an amount of less than 3% by weight, preferably from 0.1% or less to 2.5% by weight, based on the total weight of the aqueous solution obtained in step (v).

The aqueous dyestuff solution of the present invention has an alkaline pH, preferably above 8, more preferably above 9, e.g. between 8 and 14, more preferably between 9 and 13.

As the final dyestuff product normally is a water solubilization product of the solid material obtained after the sulfurization step, the most effective dilution can vary depending on the biomass origin and the sulfurization conditions, but in general it is advantageous to obtain the maximum concentrated dye solution possible which was found to be about 40 to 65%, preferably 40 to 55%, by weight, based on the total weight of the dyestuff solution. Lower concentrations, such as 10 to 40%, especially 20 to 30% by weight, based on the total weight of the dyestuff solution, may sometimes be preferred in order to assure stability to crystallization.

Another advantage of the present dye solution is that the product resulting from step (iv) is very well soluble in water or alkaline aqueous solution and is almost free of insoluble solids and ready to be used in dyeing processes. This is due to the particular pretreatments of step (i) and (ii) that transform practically all the biomass into soluble products at the end of the sulfurization. Still another advantage of the present dye solution is that the hitherto usual mercaptane odor is practically eliminated which is also believed to be due to the specific pretreatment step prior to sulfurization.

To have a ready-for-use liquid solution is much more interesting than a solid mass provided by state-of-the-art methods as present application systems use aqueous dye solutions, especially continuous applications such as Denim for Jeans, Pad-Steam, Pad-Ox or Pad sizing-Ox. Another advantage to have low sulfide content in these solutions is that the product itself can be GOTS approved and considered as non-toxic.

The aqueous dye solution of the present invention can be used to dye cellulose material, such as cotton, paper, viscose and cellulose derivatives, such as Tencel® or Lyocel®, linen or bamboo, expediently by using the currently known "sulphur dye" dyeing systems such as exhaust dyeing, Pad-Steam, Pad-Ox, Denim, Pad-sizing or Pad-sizing-Ox.

The cellulose dyeing is usually made under alkaline-reducing conditions. The exact dyeing conditions depend on the above mentioned dyeing systems and are known to the skilled artisan. The reduction conditions can be preferably achieved by using sugars, such as glucose, dextrose or fructose, as reducing agents, although other reducing agents such as hydrosulfite, sulfides, polysulfides, thiourea dioxide, sodium borohydride or hydroxyacetone, could technically be used.

Once the reduction dyeing step has been finished, the application process is followed by an oxidative fixation step using oxidants such as peroxides, percarbonates, persulfates or bromates, and optionally also cationic fixing agents.

The different steps of a continuous dyeing with a sulfur dye usually comprise:

1. Dyeing

The dyestuff is mixed with auxiliaries like wetting agents, sequestering agents and reducing agents, and with alkali, if necessary. The dyeing is made by passing and soaking the fabric into the dye solution, this dye solution may have a temperature of 70 to 80° C. in case of pad or denim application. In case of Pad-Steam application the padding is done at room temperature and after that the temperature is increased until 100° C. by steam for a minute, whereby the dye diffuses into and reacts with the fiber.

2. Washing

Formerly, after the padding or padding-steam, a washing step was performed in order to eliminate non-fixed dyestuff and let only the reacted and fixed dye on the fiber. Nevertheless recent improvements in application technology in order to save water have developed systems like Pad-Ox, Pad-Steam-Ox, Denim Ox where the washing step is eliminated and the fabric after the first padding is directly soaked and reacted in the fixative bath.

3. Fixation a) With previous washing:

Normally in this case it is enough to use an oxidant such as alkali bromate/acetic acid, alkali persulfate/carbonate or hydrogen peroxide/acetic acid, in order to oxidize the free thiol groups of the dye to sulfur bridges which transforms the previously soluble dye (in alkali and reducing media) into an insoluble pigment (in acidic and oxidant media).

b) Without previous washing:

In order to assure that the non-fixed dye that has not been eliminated by a washing step is not discharged in the fixation bath a cationic agent which blocks and insolubilizes the dye inside the fiber material is used additionally to the acid and oxidant.

4. Special Fixation (Pad-Sizing-Ox)

This is a special case basically used in Denim application where after the dyeing there is no washing and the fixation is done together with the sizing using the acid, the oxidant and preferably a cationic sizing agent composition.

Still another subject of the present invention is a cellulose material or cellulose-containing material dyed with an aqueous dye solution as described before. Cellulose or cellulose-containing materials are for example fibers, yarns, woven fabrics, knitwear, garments, in particular for apparel and denim articles, further paper and cardboard articles.

In a preferred embodiment, the dyed cellulose material is a cotton textile material, especially a Denim jeans, dyed in brown or olive shades with an aqueous sulfur dye solution prepared according to the process of the present invention, wherein the vegetal biomass comes from shells of dry fruits, in particular shells from nuts, e.g. hazelnuts, walnuts, almonds, or fruit pits, e.g. olive pits, or from coffee ground. In one preferred embodiment, this vegetal biomass is pretreated according to step (ii) with an aqueous alkaline medium.

In another preferred embodiment, this vegetal biomass is pretreated according to step (ii) with an amino or polyamino compound, especially with an amino or polyamino compound having at least two amino groups, or at least one amino and at least one hydroxyl group, as specified in the foregoing.

In these embodiments the preferred dyeing methods are selected from the group consisting of exhaust dyeing, Pad-Steam, Pad-Ox, Denim, Pad-sizing and Pad-sizing-Ox, especially Denim.

In the following examples, percentages mean percent by weight, unless indicated otherwise.

Example 1a

In a stainless steel vessel are charged and mixed the following materials: 120 g of a 50% conc. by weight aqueous solution of sodium hydroxide, 60 g of milled hazelnut shells, 50 g of water.

This mixture is heated at boiling point under reflux for 2 hours.

After this time the mass is cooled down to 80° C. and the following ingredients are added: 90 g of sulfur; 30 g of sodium sulfide hydrate (ca. 60% by weight $Na_2S$). The mixture is heated to a temperature of 170° C. and the water is being evaporated. Then the mass is heated slowly to 260° C. and maintained at this temperature for 18 hours.

During the reaction $H_2S$ is formed which is captured in an alkaline scrubber. Once the reaction is finished, 143 g of a black colored solid is obtained with a volcanic stone similar appearance.

The reaction mass is dissolved with 250 g of water and heated at boiling for 1 hour.

The obtained liquid mass of the dye is filtered through a filter-press in order to remove any insoluble residue which is less than 1 g.

About 390 g of a brown-olive colored aqueous solution of pH above 12 and a sulfide content below 2% are obtained so that an oxidation step to further reduce sulfide can be dispensed with.

Example 1b 200 g of the aqueous solution as obtained in Example 1a are mixed with 20 g of dextrose, 20 g of a 50% conc. by weight aqueous solution of sodium hydroxide and 2 g of a solution (between 5 to 15% active material) of a wetting agent (phosphoric ester derivative) and diluted with water to give 1 liter of a dyeing bath. A piece of cotton is soaked and padded in the dyeing bath and steamed for 1 minute at 100 to 102° C. After that, the dyed fabric is washed and oxidized with 5 g/l of hydrogen peroxide and 5 g/l of acetic acid.

A brown dyeing is obtained with good washing fastness as well as rubbing and light fastness.

Example 2a

In a stainless steel vessel are charged and mixed the following materials: 80 g of a 50% conc. by weight aqueous solution of sodium hydroxide, 50 g of water, 55 g of milled olive pits.

The mixture is boiled under pressure at 130° C. for 4 hours.

Then, 80 g of sulfur and 50 g of sodium sulfide hydrate (ca. 60% by weight $Na_2S$) are added. The mixture is heated slowly to 265° C. and maintained at this temperature for 24 hours. Once the reaction is finished, the reaction mass is dissolved with 300 g of water and heated at boiling for 2 hours. 450 g of an olive colored liquid of a pH between 13 and 14 are obtained.

The olive colored liquid is filtered through a filter-press to remove insoluble particles (about 0.5 g). Then, the filtered liquid is introduced into a closed vessel and a stream of $O_2$ is passed through the solution at 60° C. reacting with the free sulfide until the quantity of free sulfide is lower than 1.5%.

Example 2b 150 g of the liquid dyestuff preparation of Example 2a are added to 600 g of water in which are dissolved 20 g of dextrose and 30 g of caustic soda 48 Bé, the preparation is adjusted with water to 1000 g and 5 g of a wetting agent (phosphoric acid ester) is added. The solution is heated to 80° C. and a yarn of mercerized cotton is soaked for 10 seconds. The dyed fabric is washed and then dived into a solution at 50° C. containing 30 g/l of a cationic compound (benzalconium chloride). The anionic dyestuff is fixed by the cationic compound giving a deeper dyeing with greener brownish shade and a good washing, light and rubbing fastness.

Example 3a

In a stainless steel vessel are charged and mixed the following ingredients: 120 g of a 50% conc. by weight aqueous solution of sodium hydroxide, 30 g of water, 55 g of milled almond shells.

The mixture is heated in a closed reactor at 170° C., raising the internal pressure to 2.5 bar, for 24 hours.

Once this step is finished, the following chemicals are added: 95 g of sulfur, 40 g of sodium sulfide hydrate (ca. 60% by weight $Na_2S$).

The temperature of the mixture is raised to 250° C. and maintained at this temperature for 15 hours while the water evaporates off.

Then, the solid reacted mass is mixed with 250 g of water and 15 g of caustic soda and boiled for 1 hour, until 420 g of a colored liquid with a pH above 12 are obtained.

The liquid mass is filtered through a filter press to remove insoluble particles (about 1 g). Then, the filtered liquid is introduced into a closed vessel and a stream of air is passed through the solution at 60° C. reacting with the free sulfide until the quantity of free sulfide is lower than 1,5%.

After that, 15 g of dextrose and 15 g of caustic soda 50% are added to the solution which is heated at 75° C. for 15 minutes to assure a good reduction level of the dye composition.

Example 3b 100 g of the aqueous solution as obtained in Example 3a are diluted with 500 g of water and mixed with 10 g of glucose, 10 g of sodium carbonate and 5 g of a wetting agent. The mixture is diluted with water until 1000 g and heated at 70° C. A piece of cotton fabric is soaked during 15 seconds in the above prepared solution and, after 1 minute of air oxidation, is washed and then soaked in a solution of sodium bromate and acetic acid (2.3 g/l of sodium bromate and 10 g/l of Acetic acid 80%) and washed.

A deep dark brown dyeing (greener than the one obtained in Example 1b is obtained with a good fastness.

Example 4a

In a stainless steel vessel are charged and mixed the following materials: 120 g of milled 90% almond shell+10% hazelnut shell; 80 g of monoethanolamine and 150 g of water.

The mixture is heated until 150° C. for 15 hours in a closed reactor while the internal pressure raises to 2.5 bars. A suspension of dark reddish brown color is obtained which is then mixed with:

55 g of sodium sulfide hydrate (ca. 60% by weight $Na_2S$), 120 g of sulfur and 1 g of an antifoaming agent.

The mixture is heated slowly (in 4 to 5 hours) until 260° C. and maintained at this temperature for 16 hours while water is allowed to evaporate off. $H_2S$ release during the reaction is observed.

After the reaction time, the obtained solid is dissolved in 250 g of water and 15 g of caustic soda and then boiled for 30 minutes. After filtration, 420 g of a dark greenish solution is obtained which is not necessary to oxidize as the amount of free sulfide is less than 2.5%.

Example 4b

In an exhaust garment dyeing machine are introduced the following materials: 50 liters of water, 1 kg of the dyestuff solution as obtainable in Example 4a, 1 kg of dextrose, 1 kg of caustic soda and 0.5 kg of a wetting agent (phosphoric acid ester derivative) are combined and introduced into the dyeing machine containing 5 kg of garments (pants and shirts of cotton). The temperature is increased until 70° C. and after 20 minutes, 1 kg of sodium chloride is added. The dyeing continues for additional 30 minutes.

Then the dyeing liquid is dropped and the garments are washed twice with deionized water at 50° C. The final washing water is practically clear and without remaining coloration.

An oxidation bath is prepared with 50 liters water, 500 g of acetic acid and 500 g of hydrogen peroxide (30%). The garments are soaked in this solution during 20 minutes at 40° C., then the solution is dropped and the garments are rinsed. The garments are dyed with a deep and fast dark brown color which can be subjected to a different fashionable post-treatment, such as enzymatic or peroxide wash-down.

Example 5a

In an autoclave reactor are mixed 60 g of olive pits, 75 g of urea and 150 g of water. The mixture is heated until 160° C. and a pressure of 3 to 3.5 bar. The temperature is maintained for 12 hours. Then 70 g of sodium sulfide hydrate (ca. 60% by weight $Na_2S$), and 140 g of sulfur are added to the reaction mass and the mixture is heated slowly from 150 to 255° C. and maintaining this temperature for a period of 12 hours. During the reaction $H_2S$ is released. Then, the reacted mass is cooled down obtaining 130 g of a dark solid which is dissolved at 104 to 106° C. with 300 g of water and 60 g of sodium hydroxide solution (50%).

The solid is very well dissolved in the aqueous medium and no undissolved residues and no smell of mercaptanes are observed.

An $O_2$ stream is passed until the amount of free sulfide is below 2.5%.

Finally, 490 g of a greenish dark brown solution are obtained.

Example 5b

The exhaust dyeing process as described in Example 4b, but using the product obtained in Example 5a, is carried out. Comparing both dyeing results, the shade obtained with the product of Example 5a is a brown which is more greenish and bluish than the shade obtained with the product of Example 4a.

Example 6a 60 g of coffee grounds are mixed with 120 g of aqueous caustic soda 50% and 100 g of water and heated at 105° C. for 2 hours. Then 125 g of sulfur are added and the mixture is heated slowly until 250° C. and maintained at this temperature for 14 hours.

Once the mass is cooled, the obtained solid is dissolved with 1000 ml of water and 50 g of liquid caustic soda 50% and heated at 100° C. during 1 hour. 1250 g of a dark greenish dye solution is obtained.

Example 6b 250 g of the dye solution obtained in Example 6a are mixed with 20 g of dextrose, 25 g of aqueous caustic soda 50% and 2 g of a wetting agent and diluted with water to give 1 liter of a dyeing bath. This bath is heated to 75° C. and a cotton fabric is soaked into the dyeing bath for ten seconds.

After rinsing the fabric is oxidized in a solution containing 5 g/l of sodium bromate and 10 g/l of acetic acid developing a brown color considerably more orange (Da reddish and Db yellowish) than the browns obtained using the nutshells of Examples 1a, 3a and 4a.

Example 7a 120 g of a mixture of milled almond and hazelnut shells are mixed with 150 g of water and 80 g of diethylenetriamine, and 1 g of a silicon based antifoaming agent is added. The mixture is reacted in a closed reactor at 165° C. and under an internal pressure of 2.7 to 3.0 bar. The reaction conditions are maintained for 6 hours.

Once the pre-treatment has been finished, the reaction mass is cooled to 80° C. and the pressure is released. 210 g of sulfur and 140 g of sodium sulfide hydrate (ca. 60% by weight $Na_2S$) are added and the mixture is reacted increasing the temperature from 140° C. to 260° C. in 8 hours and keeping at this temperature for additional 15 hours. $H_2S$ and ammonia are observed to be released during the reaction.

Once the reaction has been stopped, 400 g of water are added to the obtained solid and boiled for 1 hour.

Then the obtained dark brownish liquid is adjusted with water to 800 g. It is not necessary to oxidize the solution as the amount of free sulfide is lower than 2%.

Example 7b

The dyestuff solution obtained in the previous example is used in a dyeing process as described in Example 1b and, in comparison with the Example 1b, the dyed fabric obtained shows a more concentrated and deep brown with a reddish and yellowish shade.

Example 8

60 g of red algae washed, dried, and milled with a final moisture of 10% is mixed with 350 g of water, 20 g of caustic soda, 0.5 g of antifoam (silicone based), and 0.5 g of wetting agent (phosphoric ester derivative). The mixture is boiled for 4 hours. After being boiled, 60 g of sodium sulfide (60%) and 90 g of sulfur are added to the pretreated mixture.

The mixture is heated slowly until 260° C. and maintained at this temperature for 16 hours.

Once the polymerization reaction has finished, 125 g of a dark powder is created.

The reacted material is dissolved in 230 g of water and heated at 100° C. for 30 minutes.

The powder is dissolved giving a dark green solution. Once the powder is dissolved, it creates a dark green solution.

The liquid dye obtained has affinity for cellulosic and can dye cotton according to the method of Example 1b, giving a deep dark brown, but more orange color than when nutshells were used as biomass raw material.

The invention claimed is:

1. A process for manufacturing a dyestuff comprising:
   (i) providing vegetal biomass;
   (ii) pretreating said vegetal biomass with an aqueous alkaline medium and/or with an amino and/or polyamino compound, at an elevated temperature;
   (iii) mixing pretreated vegetal biomass with at least one sulfurization agent selected from the group consisting of sulfur, sulfide, and polysulfide;
   (iv) heating said mixture to a temperature of from 120° C. to 350° C. for at least 2 hours; and
   (v) dissolving the mixture in aqueous medium and optionally removing undissolved solid particles.

2. The process as claimed in claim 1, wherein the vegetal biomass is a plant product from forest or agricultural crop activities and/or from marine sources.

3. The process as claimed in claim 1, wherein the vegetal biomass is at least one selected from the group consisting of plant products comprising from about 3% to 50% by weight, based on dry mass, of lignin, plant products comprising from about 5% to 50% by weight, based on dry mass, of phenols and polyphenols, a mixture of these plant products, and marine plants.

4. The process as claimed in claim 1, wherein in (ii), the pretreating of the vegetal biomass is carried out in an alkaline aqueous medium having a pH of at least 9.

5. The process as claimed in claim 4, wherein in (ii), the amount by weight between the vegetal biomass and the alkaline aqueous medium is from 1:10 to 10:1.

6. The process as claimed in claim 1, wherein in (ii), the amino and/or polyamino compound is used and are selected from the group consisting of monoalkylamines, monoalkylamino alcohols, ethylenediamine, propylenediamines, butylenediamines, $C_5$-$C_{18}$-alkylenediamines, urea, guanidine, dicyandiamide, di($C_1C_4$-alkylene)triamines and tri ($C_1$-$C_4$-alkylene)tetramines.

7. The process as claimed in claim 1, wherein the temperature of the pretreating is from 40° C. to 200° C.

8. The process as claimed in claim 1, wherein the duration of the pretreating is from 1 hour to 48 hours.

9. The process as claimed in claim 1, wherein the relative amount by weight between the sulfurization agent and the vegetal biomass after said pretreating, calculated on dry weight, is from 1:10 to 10:1.

10. An aqueous solution of a dyestuff prepared by the process as claimed in claim 1.

11. The solution as claimed in claim 10, comprising free sulfide in an amount of not more than 3% by weight, based on total weight of the aqueous solution.

12. An aqueous solution as claimed in claim 10, capable of being used for dyeing cellulose material and/or cellulose-containing material.

13. A cellulose material and/or cellulose-containing material dyed with an aqueous solution as claimed in claim 10.

14. The cellulose material and/or cellulose-containing material as claimed in claim 13, comprising a cotton textile material.

15. The cellulose material and/or cellulose-containing material as claimed in claim 14, wherein the cotton textile material comprises Denim jeans, dyed in brown and/or olive shades and wherein the vegetal biomass is from shells of dry fruits, fruit pits and/or from coffee ground.

16. An aqueous solution as claimed in claim 11, capable of being used for dyeing cellulose material and/or cellulose-containing material.

17. A cellulose material and/or cellulose-containing material dyed with an aqueous dye solution as claimed in claim 11.

18. The process of claim 1, further comprising said removing undissolved solid particles.

19. The process of claim 1, wherein the at least one sulfurization agent is sulfur.

20. The process of claim 1, wherein the at least one sulfurization agent is sulfide.

* * * * *